(12) United States Patent
Fåhraeus et al.

(10) Patent No.: US 7,254,839 B2
(45) Date of Patent: Aug. 7, 2007

(54) SECURED ACCESS USING A COORDINATE SYSTEM

(75) Inventors: Christer Fåhraeus, Lund (SE); Petter Ericson, Malmö (SE); Sven Olof Karlsson, Lund (SE)

(73) Assignee: Anoto AB, Lund (SE)

( * ) Notice: Subject to any disclaimer, the term of this patent is extended or adjusted under 35 U.S.C. 154(b) by 969 days.

(21) Appl. No.: 09/813,115

(22) Filed: Mar. 21, 2001

(65) Prior Publication Data

US 2002/0002539 A1    Jan. 3, 2002

Related U.S. Application Data

(60) Provisional application No. 60/207,850, filed on May 30, 2000.

(30) Foreign Application Priority Data

Mar. 21, 2000    (SE) .................................... 0000942

(51) Int. Cl.
*G06F 11/00*    (2006.01)
(52) U.S. Cl. .......................................... 726/34; 726/35
(58) Field of Classification Search ................ 713/168,
713/200–202, 176, 182–185; 380/55, 52, 380/258; 382/119, 188, 314, 187; 705/67, 705/27, 51, 64, 2, 71; 707/1; 345/179, 163, 345/421, 173, 175, 863, 180, 158, 156–157; 340/82, 990, 5.1, 5.2, 5.21, 5.23, 5.73, 5.74; 710/72–73; 726/27–30, 34–35
See application file for complete search history.

(56) References Cited

U.S. PATENT DOCUMENTS 5,297,202 A    3/1994    Kapp et al.
5,777,605 A *  7/1998    Yoshinobu et al. ......... 345/173
5,852,434 A    12/1998   Sekendur
5,892,824 A *  4/1999    Beatson et al. ............. 713/186
6,367,015 B1 * 4/2002    Kubo et al. ................. 713/183
6,421,042 B1 * 7/2002    Omura et al. ............... 345/157
2003/0061188 A1* 3/2003  Wiebe et al. ................. 707/1
2003/0084002 A1* 5/2003  Ericson et al. ................ 705/67

FOREIGN PATENT DOCUMENTS

| EP | 0 407 734 A1 | 1/1991 |
| EP | 0 677 801 A1 | 10/1995 |
| EP | 0902352 | 3/1999 |

(Continued)

OTHER PUBLICATIONS

Wacom and Softpro, Authentication handwritten signatures need no paper, 2006, pp. 1-4.*

*Primary Examiner*—Hosuk Song
(74) *Attorney, Agent, or Firm*—Birch, Stewart, Kolasch & Birch, LLP

(57) ABSTRACT

A system and method are disclosed for controlling access to an access-protected unit. A pair of coordinates may be read from a base, such as a card, using a digital pen. The system may then check if the pair of coordinates are within a coordinate area belonging to an authorized user. If so, access may be granted to the authorized user to the access-protected unit or to specific programs or functions of the access-protected unit.

66 Claims, 3 Drawing Sheets

FOREIGN PATENT DOCUMENTS

| | | |
|---|---|---|
| GB | 2104698 | 3/1983 |
| GB | 2 201 125 A | 8/1988 |
| WO | WO9308559 | 4/1993 |
| WO | WO9409447 | 4/1994 |
| WO | WO 99/03070 A1 | 1/1999 |
| WO | WO9948268 | 9/1999 |
| WO | WO 99 50787 | 10/1999 |
| WO | WO0073983 | 12/2000 |
| WO | WO0116691 | 3/2001 |
| WO | WO0126032 | 4/2001 |
| WO | WO 01 61635 A2 | 8/2001 |

* cited by examiner

| Coord. Area | Command | APU | PIN |
|---|---|---|---|
| (X1Y1);(X2Y2) | Comp | Computer 23 | 435543 |

SECURED ACCESS USING A COORDINATE SYSTEM

CROSS-REFERENCE TO RELATED APPLICATIONS

This application claims priority benefits based on Swedish Patent Application No. 0000942-3, Filed Mar. 21, 2000, and U.S. Provisional Application 60/207,850, filed May 30, 2000, the technical disclosures of both of which are hereby incorporated herein by reference.

FIELD OF THE INVENTION

The present invention relates to systems for and methods of controlling a user's access to an access-protected unit.

BACKGROUND OF THE INVENTION

To protect different types of systems and devices, such as computers or other electronic equipment, against use by unauthorized individuals, it is known to equip them with some type of access protection. Typical computer access protection includes a user log in. To log in, the user typically enters a user identity and password which checks this information against information stored earlier in order to determine if the user is authorized to use the computer. The disadvantage of this process is that a user must memorize a password which can be difficult since we surround ourselves with many systems which demand a log in process and since these often have different passwords. Many users write down their password, with the consequence that if someone finds the record this person can gain unauthorized access into the system. If the user also has the same password for several different systems, this can have far-reaching consequences.

In the Japanese document JP10222241 "Electronic Pen and System and Method for Individual Authentication", an electronic pen is described which is equipped with a gyrosensor. When a user writes his signature, the pen senses features of the signature and produces a password by means of an algorithm.

It is also known from WO 99/48268 to replace the PIN code in a mobile communication unit with a signature which the user writes with the communication unit. The communication unit is equipped with a sensor of the gyrosensor or pressure-ball type which senses the movement when the user is writing with the unit.

One problem of the above-mentioned techniques is that a signature is not difficult to forge.

SUMMARY OF A FEW ASPECTS OF THE INVENTION

The invention provides a method for controlling access to an access-protected unit. At least one pair of coordinates may be read from a base. If the pair of coordinates are within a coordinate area belonging to an authorized user, access to the protected unit may be granted.

Also, the invention provides a system for controlling a user's access to an access-protected unit. The system may include a user unit for reading at least one pair of coordinates, and a checking device for checking, on the basis of the pair of coordinates, if the user is authorized to access the access-protected unit. If so, the system provides an enabling signal to the access-protected unit.

The invention may also include a checking device for checking a user's access to an access-protected unit. The checking device may include memory for storing information about at least one coordinate area, and a processor. The processor may be operative to receive at least one pair of coordinates and check, on the basis of the coordinates, if the user is authorized to access the access-protected unit. If so, the system may provide an enabling signal to the access-protected unit.

The invention may also include a computer-readable medium containing instructions for controlling access to an access-protected unit. The instructions may include reading at least one pair of coordinates from a base; checking if the pair of coordinates are within a coordinate area belonging to an authorized user; and granting access to the authorized user if the coordinates are within the coordinate area belonging to the authorized user.

The foregoing summarizes only a few aspects of the invention and is not intended to be reflective of the full scope of the invention as claimed. Additional features and advantages of the invention are set forth in the following description, may be apparent from the description, or may be learned by practicing the invention. Moreover, both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

The invention will be described in greater detail in the text which follows, by means of embodiments and referring to the accompanying drawings, in which.

DESCRIPTION OF THE PREFERRED EMBODIMENTS

Figure 1:
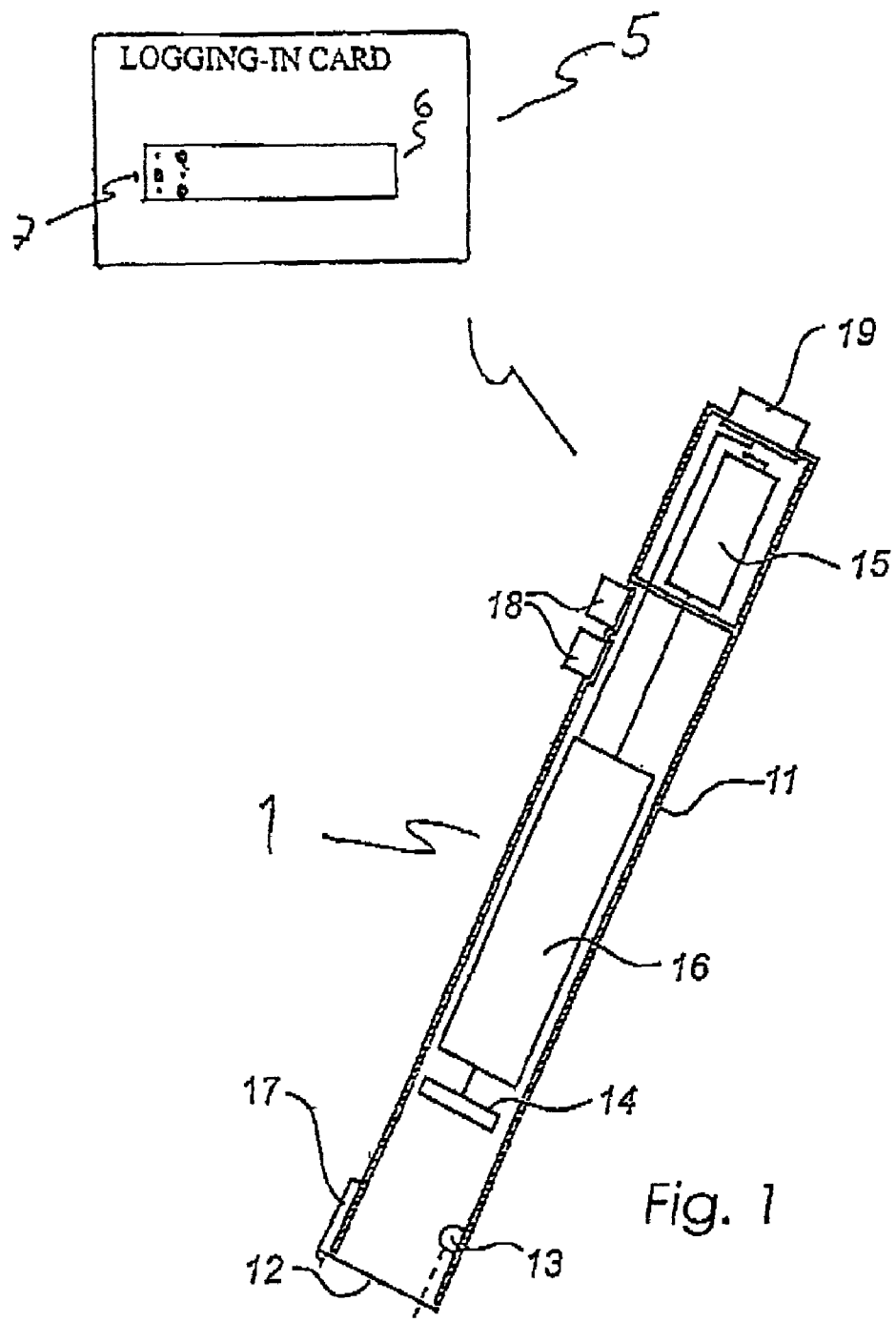
FIG. 1 illustrates a system consistent with a first embodiment of the present invention, comprising a digital pen and a coordinate base.

The invention may employ the concept of using a new parameter, namely coordinates, as a basis for checking the access to an access-protected unit. An advantage of a system which is based on coordinates is that, as will be seen below, it can be constructed with varying degrees of security, from a very simple system where it is enough to register a correct pair of coordinates, to a very secure system where both, for a given embodiment, a correct pair of coordinates and a correct signature and/or the identity of the user must be registered.

Coordinates may be suitable for being used as a basis for access control in any number of situations, but may have additional benefits when the access-protected unit lacks a keyboard, since coordinates can be registered by being read with a sensor.

For example, the coordinates can be registered by the user unit optically reading a position-coding pattern which codes coordinates for a plurality of points. Access to an access-protected unit can then be obtained by the user registering coordinates for points within a particular coordinate area.

Coordinates may also be suitable for use as parameters for access-control in systems for electronic registration of handwriting since handwritten text which is written on a writing surface with position-coding patterns can be registered electronically as a sequence of coordinates by continuous reading of the position-coding pattern. Position-coding patterns which can be used for registering handwritten text are described in, for example, U.S. Pat. No. 5,852,434 and Applicants' patent applications WO 00/73983, PCT/SE00/01895 and WO 01/16691, the technical disclosures of which are incorporated herein by reference. The position-coding patterns described in Applicants' patent applications above can code coordinates for a very large number of positions on an imaging surface. Different coordinate areas can then be allocated to different users and the position-coding pattern which corresponds to the coordinate area can be imaged on a personal card or the like allocated to the user. The user can access a certain access-protected unit by reading coordinates from this card.

The access-protected unit is a unit which is to be protected from unauthorized persons. Examples of access-protected units are computers, buildings, vehicles, web pages and different types of electronic equipment.

In one embodiment of the system according to the invention, the checking device may be arranged to check if the coordinates are lying within a predetermine coordinate area for checking the authorization of the user.

As a very simple example, a hand-held scanner or digital pen can be envisaged for electronic registration of handwriting, where the owner can only log in by registering coordinates from a card obtained with the purchase of the scanner/pen. In this case, the checking device may be located in the scanner/pen and may only need to have information on the extent of the predetermined coordinate area and to check that the registered coordinates are lying within this field.

Log in on different scanners/pens can require coordinates from different coordinate areas.

The coordinate area may be defined in advance and can, for example, be defined as lying within determined coordinates which represent the corners of the field.

In an alternate embodiment of the system, the user unit is arranged to register a user signature as a sequence of coordinates which describe the displacement of the user unit when a user is writing the user signature with the user unit and where at least one pair of coordinates comprise the sequence of coordinates.

An advantage of the user writing his signature is that the security may be increased. The signature may be the signed name of the user but can also be a symbol or any type of sign. For an unauthorized person to be able to log in to the access-protected unit, both access to the coordinate area and signature of the authorized user may be required in this case. This higher security can be implemented without the hardware of the system needing to be changed, since registration of the signature and registration of the coordinates can be done with the same technology.

The checking device may be suitably arranged to compare the sequence of coordinates which thus represent the registered signature, with a sequence of coordinates stored earlier for checking the authorization of the user. The enabling signal for the access-protected unit may only be given if the sequences correspond to the desired extent. As used herein, when correspondence is detected the sequence of coordinate pairs are said to "favorably compare" with the stored sequence.

In one embodiment of the system, the user unit may have a unique identification code and the checking device may be arranged to check authorization of the user with the identification code in combination with at least one pair of coordinates.

By checking not only the coordinates but also the identification code, the security of the system will increase. If, for example, the coordinates are imaged on a card and this card is stolen, the thief cannot have access to the access-protected unit without the associated user unit. The identification code can be an identification number, such as a PIN (Personal Identification Number), a symbol, or any type of sign.

In another embodiment of the system, the user unit may be arranged to register a sequence of coordinates which are associated to a specific access-protected unit.

For example, the user can write different commands with the user unit and the user unit may then register this as sequences of coordinates. Depending on what commands the user is writing different access-protected units can be enabled. In this way the user can use the same equipment to log in to different physical units.

The user unit, the checking device and the access-protected unit can be physically placed in different ways with respect to one another.

The checking device can be physically integrated with the user unit, with the access-protected unit, or be self-contained. The checking device can also be physically divided, which implies that a certain part of the authorization check is done in one place and another part of the authorization check is done in another place. For example, a first check can be done in the user unit and a second check in the access-protected unit.

When the checking device is self-contained, it can be used jointly for a plurality of user units and a plurality of access-protected units. It then may become more complicated and need to have a greater memory and processing capacity, among other things.

When the checking device is integrated with the user unit, it may only need to check users of the access-protected unit or units which can be accessed via the user unit.

In another embodiment of the system, the access-protected unit may be integrated with the user unit. The access may then apply to the user unit itself. The user unit and the access-protected unit can, therefore, be one and the same unit. In this case, the user may start the unit and may then log in, during which she may only use the functions of the unit which are required for log in, i.e., registration of coordinates and possibly other log in parameters. The functions which may be accessible during log in can be said to correspond to the user unit, while the remaining functions which may become accessible only after correct log in can be said to correspond to the access-protected unit.

The checking device can be integrated with the user unit and the access-protected unit.

As an alternative, the access-protected unit can be isolated from the user unit. It can be integrated with the checking device.

In another embodiment of the system, the access-protected unit may be a digital pen which can be used for digitizing handwritten text.

As already mentioned, the checking device can be common to a number of user units which may send the registered coordinates to the checking device. In this embodiment of the system, the information stored in the checking device may relate to a plurality of coordinate areas. The checking device can be, for example, web-based and reached via a computer network.

Each coordinate area can be associated with one or more users and/or one or more access-protected units. In the former case, a number of users can thus reach a unit by registering coordinates from one and the same predetermined field. This can be desirable, for example, if the access-protected unit is a computer which a number of persons are to be able to use, or premises to which a number of persons are to be able to gain entry. In the latter case, for example, a person can access different access-protected units by registering coordinates from one and the same predetermined coordinate area. For example, a person may be permitted to log in to different apparatuses via a standard log in process.

In one embodiment of the system, if the user is authorized to access the access-protected unit, the access-protected unit may be arranged to start at least one function associated with at least one of the plurality of coordinate areas.

One advantage with this is that it may save the user time when logging in to an access-protected unit. The user can initially decide which functions he wishes to start when he is logging in. This set up can be changed when the user is logged in. Functions include different kinds of applications and programs.

In another embodiment of the system, the access-protected unit may be associated with at least one of a plurality of coordinate areas.

The coordinates may be registered by the user unit control for which access-protected unit the access is intended. This may result in a simple and flexible way of obtaining access to a certain access-protected unit. Different coordinate areas can be associated with different access-protected units. A coordinate area can also be associated with more than one access-protected unit, but then the user may need to indicate in some way which access-protected unit he wishes to access.

In another embodiment of the system, there may be at least one authorized user identity which is associated with at least one of a plurality of coordinate areas.

The coordinates which are registered by the user unit may control the user identity. Within the coordinate area which is associated with at least one authorized user, there can also be subareas which are associated with different access-protected units. The advantage of this is that if someone can forge a signature, he must also have access to the base with the predetermined coordinates which are associated with the signature.

In another embodiment, the system may include a base provided with a position-coding pattern which enables coordinates to be determined and from which the user unit is arranged to register at least one pair of coordinates.

Different coordinates are registered depending on where on the base the user places the user unit. The coordinates can be allocated different meanings. The base can be divided into different coordinate areas in which the user writes his signature or only places the user unit. Depending on which coordinate area the user is selecting, for example, access to different units can be carried out. This results in a quick and flexible activation of the access-protected unit for the user.

In another embodiment, the user unit may include an optical sensor and image processor for registering at least one pair of coordinates.

The optical sensor may obtain images and the image processor may process the images, determining the coordinates from the content of the images, which may be the above-mentioned position-coding pattern.

The invention may also provide a checking device for checking a user's access to an access-protected unit, information about at least one coordinate area being stored in the checking device, the checking device being arranged to receive at least one pair of coordinates from a user unit which belongs to the user. The invention may then check, on the basis of the received coordinates, if the user is authorized to access the access-protected unit and, if so, to provide an enabling signal to an access-protected unit.

The invention may also include a method for controlling access to an access-protected unit with the aid of a user unit, including the steps of registering at least a pair of coordinates from a base using the user unit, checking with the checking device and on the basis of the registered coordinates, if the user is authorized to access the access-protected unit, and, if so, providing an enabling signal to the access-protected unit.

According to another aspect of the invention, a method may be provided for checking authorization to an access-protected unit comprising receiving at least one pair of coordinates from a user unit which belongs to a user, checking on the basis of the received coordinates if the user is authorized to access the access-protected unit, and if so, providing an enabling signal to the access-protected unit.

The invention may also provide a computer program which is stored on a computer-readable storage medium which includes instructions for causing the computer to carry out methods described above.

The invention may further permit use of a position-coding pattern which codes coordinates for controlling access to an access-protected unit.

In the text which follows, two exemplary schemes are described for implementing the invention. The first relates to access to a digital pen. The second relates to access to a computer. In the first scheme, the system for controlling access to the digital pen may be integrated with the digital pen. In the second scheme, the system for access control may be separate from the access-protected unit, i.e. the computer.

FIG. 1 shows a digital pen 1 and a coordinate base 5. The digital pen 1 can be used as a normal writing pen, with a difference being that the text which is written can be recognized in digital form in the pen. To protect the pen against unauthorized users, it may be provided with a system for controlling access to it (a log in system).

Log In Card

FIG. 1 shows an embodiment of a log in card 5 which in this case may be similar to a normal magnetic or credit card with respect to size and material. The log in card 5, which may have a size of 10 mm×200 mm, may include a writing field 6 provided with coordinates which can be read by the digital pen 1. The coordinates can be specified in explicit or coded form. In this embodiment, the log in card 5 may be provided with coordinates which are coded with the aid of a position-coding pattern 7. The pattern 7 is shown schematically as a number of dots on a part of the log in card 5.

The writing field 6 may be intended for the user's signature. The log in card may also be made of a material permitting the signature to be erased after having been written. As an alternative, the combination of pen and log in card can be such that no pigment is deposited on the log in card when the user is writing the signature.

The position-coding pattern 7 may have the characteristic that, if an arbitrary part of the pattern is registered with a certain minimum size, its position in the position-coding pattern and thus the log in card 5 may be determined unambiguously.

The position-coding pattern 7 can be of the type shown in U.S. Pat. No. 5,852,434, incorporated herein by reference, where each position is coded by a specific symbol.

However, the position-coding pattern 7 may alternatively and advantageously be of the type shown in Applicants' above-mentioned Applications WO 00/73983, PCT/SE00/01895 and WO 01/16691, where each position may be coded by a plurality of symbols and each symbol may contribute to the coding of a number of positions. The position-coding pattern 7 may be built up of a small number of types of symbols. An example is shown in WO 00/73983, where a larger dot represents a "one" and a smaller dot represents a "zero". Another example is shown in PCT/SE00/01895 and WO 01/16691, where four different displacements of a dot in relation to a raster point code four different values.

Digital Pen

The digital pen 1 in FIG. 1 may include a casing 11. The short side of the casing may have an opening 12.

The casing may include an optical part, an electronic part and a power supply.

In the exemplary embodiment, the optical part may include at least one light-emitting diode 13 for illuminating the surface which is to be imaged and a light-sensitive area sensor 14, for example a CCD or CMOS sensor, for registering a two-dimensional image. The pen may also contain a lens system.

The power supply for the pen may be obtained from a power source, such as a battery 15 which may be mounted in a separate compartment in the casing 11.

The electronic part may contain a processor 16 which may be programmed for recording an image from the sensor 14, identifying symbols in the image, determining which pair of coordinates the symbols are coding and storing these coordinates in its memory. The processor 16 may also be programmed for analyzing the stored pairs of coordinates and converting them to a polygon train which constitutes a description of how the user unit is displaced over a surface provided with the position-coding pattern, which displacement, for example, can represent the user's signature or some other form of handwritten information.

The pen 1 also may comprise a pen point 17 with the aid of which the user can write normal pigment-based writing which, at the same time as it is written, is registered digitally by the pen 1 with the aid of the position-coding pattern. The pen point 17 can be retracted and extended so that the user can control if it is to be used or not. As used herein, the pen point generally refers to any marking or writing element regardless of whether it uses pigment, ink, or other marking material.

The pen 1 may also include buttons 18 with the aid of which the unit may be activated and controlled. It also may have a transceiver 19 for wireless communication, for example by IR light or radio waves (e.g. BLUETOOTH), with external units.

Log In with the Aid of the Pen

As mentioned, the pen 1 may be provided with a log in system. When the pen is switched on, it may be configured to require the user to log in prior to use. To handle the log in, the pen 1 may be provided with a log in program. Moreover, information regarding at least the user's specific coordinate area may be stored in the memory.

In a first example, the access-unit may be the digital pen 1 which may also include a checking device having a memory in which coordinate areas and associated user identities are stored. Several users can have authorization for the pen 1. Each user can have his or her own log in card 5. The log in card 5 can be a card which the user carries, for example, in a wallet. When a user wishes to log in to the digital pen 1, she may place it on the writing field 6 of the log in card 5, which may be provided with a position-coding pattern 7 unique to the user. A part of the pattern may be recorded optically by the digital pen 1. A program may convert the pattern into coordinates which are transferred to the checking device. The checking device may then check that the coordinates are within a predetermine coordinate area belonging to an authorized user. If so, the user may obtain access to the functions of the digital pen 1.

Different users may have different coordinate areas, which may make it possible to control the programs to which different users are able to gain access by the pen, starting a different program depending on the coordinate area.

To increase security on log in, it may be required that a user writes his signature in the writing field. The signature may be transferred to the checking device as a sequence of coordinates. The checking device may also check, in addition to the field within which the coordinates are located, if the sequence of coordinates for this coordinate area corresponds to an authorized sequence stored in the memory. As used herein, when correspondence is detected the sequence of coordinate pairs are said to "favorably compare" with the stored sequence. Thus, it may not be enough that an unauthorized person obtains the writing base and pen, but the unauthorized person must also be able to forge the signature of the authorized user in order to gain access to the functions of the pen.

Log In to Computer

Figures 2, 3:
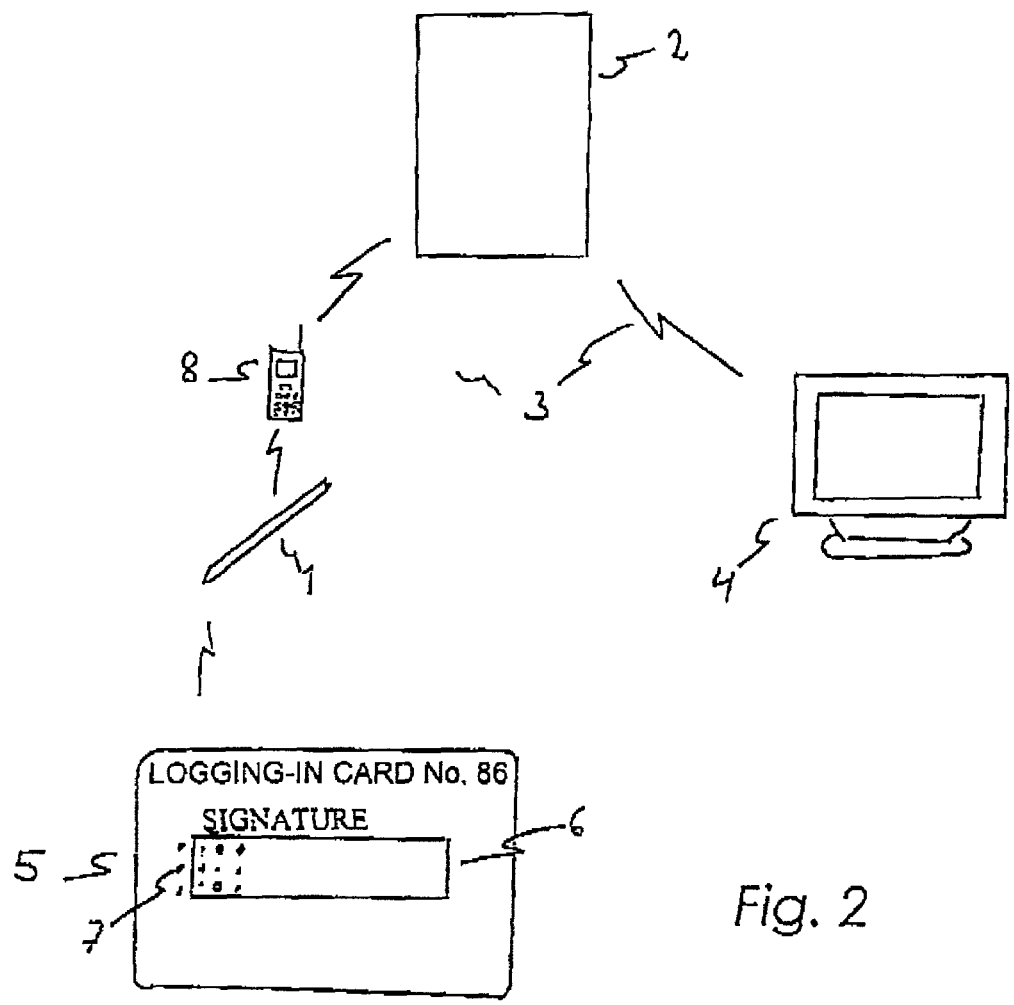
FIG. 2 illustrates a system consistent with a second embodiment of the present invention, comprising a user unit and a log in card.
FIG. 3 schematically illustrates a storage structure for storing, among other things, checking information in a checking device which is used in a system consistent with an embodiment of the present invention.

FIG. 2 shows a second embodiment of the invention, in which the access-protected unit is a computer 4, the user unit is a digital pen 1 and the checking device is available on the web in the form of a server unit 2. The server unit 2 may handle a plurality of digital pens 1 and a plurality of computers 4.

The digital pen 1 may be arranged to transfer information which is generated by the user to the server unit 2. While the information may be transmitted by a conventional hard-wired interface, in this embodiment the information may be transferred wirelessly to a network-access unit 8 by a wireless communication interface, such as a Bluetooth or IRDA interface, which, in turn, may transfer the information to the server unit 2. The network-access unit 8 may be a mobile telephone in this embodiment. As an alternative, it can be a computer or some other suitable unit which has an interface with a network, such as the Internet or a local company network. As an alternative, the network-access unit can constitute an integrated part of the user unit, e.g. digital pen 1.

The server unit 2 may be a computer in a network of computers. It may be constructed as a traditional server unit with one or more processors, memory of different types, peripheral units and couplings to other computers in the network, but it has new software for carrying out the functions described herein. It may also have information stored in its memory in order to be able to handle these functions.

In the memory of the server unit 2, information on the coordinate areas may be stored. The coordinate areas can be of different size and have different shape. A rectangular coordinate area, as exemplified in this embodiment, can be described with the aid of pairs of coordinates which represent points in the corners of the coordinate area. The writing field 6 on the log in card 5 may occupy one coordinate area.

Information or rules for each coordinate area may be found in a data structure in the memory of the server unit 2. The information or rules may define how the information which can be associated with the coordinate area is to be processed.

FIG. 3 shows an embodiment of such a structure in table form. In a first column 30 of the table, the coordinate areas are defined with the aid of the coordinates (x1, y1; x2, y2; x3, y3; x4, y4) for the corners of the coordinate area which have been assumed to be rectangular in this case. In a second column 31, a representation of the signature of the authorized user is stored so that the server unit 2 can compare a received signature with a signature stored earlier. As used herein, when correspondence is detected the sequence of coordinate pairs are said to "favorably compare" with the stored sequence. In a third column 32, a user identity may be stored in the form of a serial number for the user unit 1 of the authorized user. Naturally, this is a very simple structure which is only used for illustrating the principles of the invention. Considerably more complex structures and rules for security checking are conceivable within the scope of the invention.

Figures 4, 5:
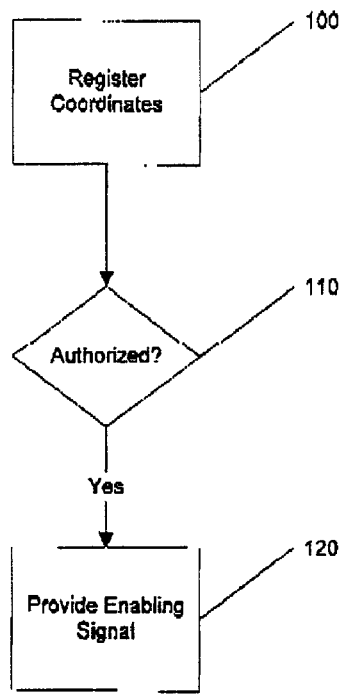
FIG. 4 illustrates a flow chart of a method consistent with an embodiment of the present invention.
FIG. 5 illustrates a rules coordinate table consistent with an embodiment of the present invention.

FIG. 4 illustrates a flow chart of a method consistent with the present invention. At step 100, when a user wishes to obtain access to a computer 4, the user may place the digital pen 1 on the writing field 6 and the pen 1 may register the pattern 7 and calculate corresponding coordinates. The coordinates, together with a user identity stored in the user unit 1, may be forwarded via the mobile telephone 8 to the server unit 2. The server unit 2 may check to which coordinate area the registered coordinates belong. Each computer 4 in the system may be associated with at least one coordinate area. The server unit 2 may determine in this way for which computer the access is intended. At step 110, the server unit 2 may then check that the user identity has the authority to log in to the computer for which the log in is intended. At step 120, if the user has authority, a signal may be sent to the computer 4 for which the access is intended, which may result in the user now being logged in to the computer 4. It is possible to send along special information from the server unit to a specific computer 4. This special information can comprise user-specific information which, in an exemplary embodiment, may start programs specific to the user. It can also be that different users obtain access to different amounts of information on the computer 4, which has the result that only certain parts of the content of the computer 4 may be opened up to the user. If the user does not have authorization for the computer 4, a message about this can be sent to the digital pen 1.

To increase the security in the system, the user may also write his signature on the writing field 6 of the log in card 5. The signature may be registered as a sequence of coordinates and, together with the user identity stored in the user unit, may be forwarded via the mobile telephone 8 to the server unit 2. The server unit 2 may compare the received sequence of coordinates, i.e. the signature, with a sequence of coordinates stored earlier with the user identity. As used herein, when correspondence is detected the sequence of coordinate pairs are said to "favorably compare" with the stored sequence. If the received signature is determined to correspond, a signal may be sent to the computer 4 and the user is logged in.

It is also possible to arrange the checking device in the computer 4, i.e. the access-protected unit.

Another embodiment of the invention is similar to previous embodiments, but in this embodiment the user can log in to different physical entities by writing a command to select a log in and entity. The writing field 6 in this embodiment may be used to write a command associated with a physical entity, for example a computer. In this embodiment, the digital pen may have a unique identification code or PIN (Personal Identification Number). The identification code may be resident in the pen or user unit and may be used by the checking device which may also be located in the user unit. In an exemplary embodiment of the invention, the identification code may be a manufacturing number of the pen and may be hardcoded into the memory of the digital pen unable to be changed.

The digital pen may be arranged to transfer the unique PIN and information generated by the user, to the server unit.

In the memory of the server unit, information of the coordinate areas, commands and PINs may be stored.

In a data structure in the memory of the server unit 2, information or rules for each coordinate area may be found which define how each coordinate area is to be processed.

FIG. 5 shows an example of such a structure in table form. In a first column 40 of the table, the coordinate areas are defined with the aid of the coordinates (x1, y1; x2, y2) for determining the corners of the coordinate area which are assumed to be rectangular in this case. In a second column 41, a representation of a command associated with an access-protected unit, which is represented in column 42, is stored. In a fourth column 43, a PIN is stored so that the server unit 2 can compare a received PIN with a PIN stored earlier. Naturally, this is a very simple structure which is only used for illustrating the principles of the invention. Considerably more complex structures and rules for security checking are conceivable within the scope of the invention.

When a user wishes to obtain access to a computer 4. The user may place the digital pen 1 on the writing field 6 and the pen may register the pattern 7 and calculate corresponding coordinates. The user may write, for example, the command "comp" to log in to the computer. The pen may register the written command and calculate the relative corresponding coordinates. The pen may then forward the coordinates and the PIN of the digital pen 1 via the mobile phone 8 to the server unit 2. The server unit checks to determine to which coordinate area the registered coordinate belongs. Each user in the system may be associated with at least one coordinate area. The server unit may then check the command "comp" to determine which physical unit the user is logging in to. In FIG. 5, the command "comp" is associated with "Computer 23." Thereafter, it checks the PIN to determine if this pen in combination with the pattern 7 is allowed to have access to "Computer 23." If access is allowed, the server unit 2 may send a signal to "Computer 23" and the user is logged in.

Non-recurrent Code

A predetermined coordinate area on a writing base can also function as a non-recurrent field which, after having been used once, is used up. This can be applicable, by way of example only, when it is wished to be able to discard the writing base after use or when it is wished to keep it as a receipt for access to the system. It can be that the signature is also written on the base with ink, enabling an unauthorized person to easily follow the written signature and in this way obtain unauthorized access to the access-protected unit. If, on the other hand, this pattern is used up, the only information remaining is the signature of the user.

Concurrently filed with the application for this patent are applications entitled Systems and Methods for Information Storage based on Swedish Application No. 0000947-2, filed Mar. 21, 2000, and U.S. Provisional Application No. 60/207, 839, filed May 30, 2000; Secured Access Using a Coordinate System based on Swedish Application No. 0000942-3, filed Mar. 21, 2000, and U.S. Provisional Application No. 60/207, 850 filed on May 30, 2000; System and Method for Printing by Using a Position Coding Pattern based on Swedish Application No. 00012450, filed on Apr. 5, 2000, and U.S. Provisional Application No. 60/210,651, filed on Jun. 9, 2000; Apparatus and Methods Relating to Image Coding based on Swedish Application No. 0000950-6, filed on Mar. 21, 2000, and U.S. Provisional Application No. 60/207,838, filed on May 30, 2000; Apparatus and Methods for Determining Spatial Orientation based on Swedish Application No. 0000951-4, filed on Mar. 21, 2000, and U.S. Provisional Application No. 60/207,844, filed on May 30, 2000; System and Method for Determining Positional Information based on Swedish Application No. 0000949-8, filed Mar. 21, 2000, and U.S. Provisional Application No. 60/207,885, filed on May 30, 2000; Method and System for Transferring and Displaying Graphical Objects based on Swedish Application No. 00009415, filed Mar. 21, 2000, and U.S. Provisional Application No. 60/208,165, filed May 31, 2000; Online Graphical Message Service based on Swedish Application No. 00009449, filed Mar. 21, 2000, and U.S. Provisional Application No. 60/207,881, filed May 30, 2000; Method and System for Digitizing Freehand Graphics With User-Selected Properties based on Swedish Application No. 00009456, filed Mar. 21, 2000, U.S. Provisional Application No. 60/207,882, filed May 30, 2000; Data Form Having a Position-Coding Pattern Detectable by an Optical Sensor based on Swedish Application No. 0001236-9, filed Apr. 5, 2000, and U.S. Provisional Application No. 60/208,167, filed May 31, 2000; Method and Apparatus for Managing Valuable Documents based on Swedish Application No. 00012526, filed Apr. 5, 2000, and U.S. Provisional Application No. 60/210,653 filed Jun. 9, 2000; Method and Apparatus for Information Management based on Swedish Application No. 0001253-4 filed Apr. 5, 2000, and U.S. Provisional Application No. 60/210,652, filed Jun. 9, 2000; Device and Method for Communication based on Swedish Application No. 0000940-7, filed Mar. 21, 2000, and U.S. Provisional Application No. 60/208,166, filed May 31, 2000; Information-Related Devices and Methods based on Swedish Application No. 00012351, filed Apr. 5, 2000, and U.S. Provisional Application No. 60/210,647, filed Jun. 9, 2000; Processing of Documents based on Swedish Application No. 00009548, filed Mar. 21, 2000, and U.S. Provisional Application No. 60/207,849, filed May 30, 2000; Secure Signature Checking System based on Swedish Application No. 0000943-1, filed Mar. 21, 2000, and U.S. Provisional Application No. 60/207,880, filed May 30, 2000; Identification of Virtual Raster Pattern, based on Swedish Application No. 00012351, filed Apr. 5, 2000, and U.S. Provisional Application No. 60/210,647, filed Jun. 9, 2000, and Swedish Application No. 00041327, filed Nov. 10, 2000, and U.S. Provisional Application No. 60/261,123, filed Jan. 12, 2001; and U.S. Provisional Application No. 60/277,285, filed on Mar. 21, 2001, entitled Communications Services Methods and Systems.

The technical disclosures of each of the above-listed U.S. applications, U.S. provisional applications, and Swedish applications are hereby incorporated herein by reference. As used herein, the incorporation of a "technical disclosure" excludes incorporation of information characterizing the related art, or characterizing advantages or objects of this invention over the related art.

In the foregoing Description of Preferred Embodiments, various features of the invention are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Preferred Embodiments, with each claim standing on its own as a separate preferred embodiment of the invention.

What is claimed is:

1. A method for controlling access to an access protected unit, the method comprising:
   reading at least one pair of absolute coordinates from an encoded base;
   checking if the pair of coordinates are within a coordinate area belonging to an authorized user; and
   granting access by the authorized user to the access protected unit if the coordinates are within the coordinate area belonging to the authorized user, otherwise denying access; and wherein reading at least one pair of absolute coordinates from an encoded based includes recording a pattern from the base with a digital pen, and converting the recorded pattern into a pair of coordinates.

2. The method according to claim 1 wherein the coordinate area is designated by two pairs of coordinates, the first coordinate pair designating one corner of the coordinate area and the second coordinate pair designating a second corner of the coordinate area, wherein the second coordinate pair lies diagonal to the first coordinate pair.

3. The method according to claim 1, wherein:
   the reading reads a sequence of coordinate pairs corresponding to a displacement of a digital pen by the user and the method further comprises:
   checking if the sequence of coordinate pairs favorably compares to a stored sequence of coordinate pairs belonging to the authorized user; and
   granting access by the authorized user to the access protected unit if the sequence of coordinate pairs favorably compares to the stored sequence of coordinate pairs belonging to the authorized user.

4. The method of claim 3 wherein the stored sequence of coordinate pairs corresponds to a signature of the authorized user.

5. The method according to claim 3, wherein the stored sequence of coordinate pairs corresponds to one of a symbol and a sign.

6. The method according to claim 1, wherein
   the reading a sequence of coordinate pairs corresponding to the displacement of a digital pen by the user, and the method further comprises;
   checking if the sequence of coordinate pairs favorably compares to a stored sequence of coordinate pairs associated with the access protected unit; and granting access by the authorized user to the access protected unit if the sequence of coordinate pairs favorably compares to the stored sequence of coordinate pairs associated with the access protected unit.

7. The method according to claim 1, wherein
the reading a sequence of coordinate pairs corresponding to a displacement of a digital pen by the user, and the method further comprises;
checking if the sequence of coordinate pairs favorably compares to a stored sequence of coordinate pairs associated with a program or function of the access protected unit; and
activating the program or function of the access protected unit if the sequence of coordinate pairs favorably compares to the stored sequence of coordinate pairs associated with the program or function of the access protected unit.

8. The method according to claim 1, further comprising:
reading an identification code from the digital pen;
checking if the identification code from the digital pen corresponds to an authorized identification code; and
granting access by the authorized user to the access protected unit, only if the identification code from the digital pen corresponds to the authorized identification code.

9. The method of claim 8, wherein checking if the identification code from the digital pen corresponds to an authorized identification code, further comprises:
checking if the identification code from the digital pen corresponds to the at least one pair of coordinates from the base.

10. The method of claim 8, wherein checking if the identification code from the digital pen corresponds to an authorized identification code, further comprises checking if the identification code from the digital pen corresponds to the authorized identification code corresponding to the access protected unit.

11. The method according to claim 1, wherein the reading further comprises:
optically reading the at least one pair of coordinates from the base, wherein the base is provided with a position coding pattern for coding a plurality of pairs of coordinates.

12. The mehtod according claim 1, wherein the values of the at least one pair abslute coordinates are not based upon a physical device which is separate from the base.

13. The mehtod according claim 12, where in the physical device is a template.

14. A system for controlling a user's access to an access protected unit, comprising:
a user unit for reading at least one pair of absolute coordinates; and
a checking device which determines whether the at least one pair of coordinates are associated with at least one coordinate area belonging to an authorized user for authorizing access to the access-protected unit, and providing an enabling signal to the access protected unit when the checking device determines that access is authorized, wherein the user unit is further operable to read a sequence of coordinate pairs which describe displacement of the user unit when a user is writing with the user unit.

15. The system of claim 14 wherein the user unit comprises an optical sensor and image processor.

16. The system of claim 14 further comprising a base provided with a position coding pattern, wherein said user unit is configured to read the position coding pattern from the base and to convert the position coding pattern to the at least one pair of coordinates.

17. The system of claim 14 wherein the checking device is operable to compare the sequence of coordinate pairs with a stored sequence of coordinate pairs and, on the basis of a favorable comparison, to provide an enabling signal to the access protected unit.

18. The system of claim 17 wherein the stored sequence of coordinate pairs represent a user's signature.

19. The system of claim 17 wherein the stored sequence of coordinate pairs represents a function or program within the access protected unit, and the checking device is operable to activate the function or program within the access protected unit based on the favorable comparison.

20. The system of claim 17, wherein the stored sequence of coordinate pairs cooresponds to one of a symbol and a sign.

21. The system according to claim 14, wherein the checking device is integrated with the user unit.

22. The system according to claim 14, wherein the access protected unit is integrated with the user unit.

23. The system according to claim 14, wherein the access protected unit is a digital pen.

24. The system according to claim 14, wherein information about a plurality of coordinate areas is stored in the checking device.

25. The system according to claim 24, wherein the access protected unit is associated with at least one of said plurality of coordinate areas.

26. A system according to claim 24, wherein at least one authorized user identity is associated with at least one of said plurality of coordinate areas.

27. The system according to claim 14 further comprising a server unit in communication with the user unit and the access protected unit.

28. The system according to claim 27 wherein the user unit further comprises a wireless communication unit in communication with a network access unit in communication with the server unit.

29. The system according to claim 27 wherein the user unit further comprises a network access unit in communication with the server unit.

30. The system according to claim 27 wherein the user unit further comprises a wireless communication unit in communication with the server unit.

31. The system according to claim 27 wherein the checking device is integrated with the server unit.

32. The system according to claim 14 wherein the checking device is further operable to:
read an identification code from the user unit;
check if the identification code from the user unit corresponds to an authorized identification code; and
grant access by the user to the access protected unit, only if the identification code from the user unit corresponds to the authorized identification code.

33. The system of claim 14, further comprising:
a plurality of user units for reading at least one pair of coordinates; and
a plurality of bases, each of whitch is provided with a subset belonging to a plurality of subsets of a position coding pattern, wherein each subset codes coordinates within a unique coordinate area.

34. The system of claim 14, wherein the stored sequence of coordinate pairs cooresponds to one of a symbol and a sign.

35. A checking device for checking a user's access to an access protected unit, the checking device comprising:
  memory for storing information about at least one coordinate area; and a processor operative to:
  receive at least one pair of absolute coordinates;
  determine whether the at least one pair of coordinates are associated with the stored information for authorizing access to the access-protected unit;
  provide an enabling signal to the access-protected unit if the processor determines that access is authorized; read an identification code from a digital pen;
  check if the identification code from the digital pen corresponds to an authorized identification code; and grant access by the user to the access protected unit if the identification code from the digital pen corresponds to the authorized identification code.

36. The checking device according to claim 35 wherein the processor is further operative to check if the coordinates are lying within the at least one coordinate area for checking the user's authorization.

37. The checking device according to claim 35 wherein the memory is further operative to store a sequence of coordinate pairs and the processor is further operative to receive a sequence of coordinate pairs and check the received sequence of coordinate pairs with the stored sequence of coordinate pairs for checking the user's authorization.

38. The checking device according to claim 35, wherein the checking device is integrated with the user unit.

39. The checking device according to claim 35 wherein the memory stores information about a plurality of coordinate areas.

40. The checking device of claim 39 wherein the access protected unit is associated with one of the plurality of coordinate areas.

41. The checking device of claim 39 wherein a program or function is associated with one of the plurality of coordinate areas.

42. The checking device of claim 35 further comprising a communications interface operably coupled to the processor.

43. The checking device of claim 42 wherein the communications interface is operable to communicate with a server unit.

44. The checking device of claim 42 wherein the communications interface is operable to communicate with a user unit.

45. The checking device of claim 42 wherein the communications interface is a wireless interface.

46. The checking device of claim 42 wherein the communications interface is a hard-wired interface.

47. A computer-readable medium containing instructions for controlling access to an access protected unit, the instructions comprising:
  reading at least one pair of absolute coordinates from a base;
  checking if the pair of coordinates are within a coordinate area belonging to an authorized user;
  and granting access by the authorized user to the access protected unit if the coordinates are within the coordinate area belonging to the authorized user, otherwise denying access; and
  wherein reading the at least one pair of coordinates includes recording a pattern from the base with a digital pen, and converting the pattern into a pair of coordinates.

48. The computer-readable medium of claim 47 wherein the coordinate area is designated by two pairs of coordinates, the first coordinate pair designating one corner of the coordinate area and the second coordinate pair designating a second corner of the coordinate area, wherein the second coordinate pair lies diagonal to the first coordinate pair.

49. The computer-readable medium of claim 47 wherein the instructions further comprise the instructions of:
  reading a sequence of coordinate pairs corresponding to a displacement of the digital pen by the user;
  checking if the sequence of coordinate pairs favorably compares to a stored sequence of coordinate pairs belonging to the authorized user; and
  granting access by the authorized user to the access protected unit if the sequence of coordinate pairs favorably compares to the stored sequence of coordinate pairs belonging to the authorized user.

50. The computer-readable medium of claim 49 wherein the stored sequence of coordinate pairs corresponds to a signature of the authorized user.

51. The computer readable medium of claim 49, wherein the stored sequence of coordinate pairs corresponds to one of a symbol and a sign.

52. The computer-readable medium of claim 47 wherein the instructions further comprise the instructions of:
  reading a sequence of coordinate pairs corresponding to a displacement of the digital pen by the user;
  checking if the sequence of coordinate pairs favorably compares to a stored sequence of coordinate pairs associated with the access protected unit; and
  granting access by the authorized user to the access protected unit if the sequence of coordinate pairs favorably compares to the stored sequence of coordinate pairs associated with the access protected unit.

53. The computer-readable medium of claim 47 wherein the instructions further comprise the instructions of:
  reading a sequence of coordinate pairs corresponding to the displacement of the digital pen by the user;
  checking if the sequence of coordinate pairs favorably compares to a stored sequence of coordinate pairs associated with a program or function of the access protected unit; and
  activating the program or function of the access protected unit if the sequence of coordinate pairs favorably compares to the stored sequence of coordinate pairs associated with the program or function of the access protected unit.

54. The computer-readable medium of claim 47 wherein the instructions further comprise the instructions of:
  reading an identification code from the digital pen;
  checking if the identification code from the digital pen corresponds to an authorized identification code; and
  granting access by the authorized user to the access protected unit if the identification code from the digital pen corresponds to the authorized identification code.

55. The computer-readable medium of claim 54 wherein the instruction of checking if the identification code from the digital pen corresponds to an authorized identification code, further comprises the instruction of:
  checking if the identification code from the digital pen corresponds to the at least one pair of coordinates from the base.

56. The computer-readable medium of claim 54 wherein the instruction of checking if the identification code from the digital pen corresponds to an authorized identification code, further comprises the instruction of:
  checking if the identification code from the digital pen corresponds to the access protected unit.

57. A base for controlling access to an access protected unit; comprising;

a substrate;

a writing field associated with the substrate; and a position coding pattern associated with the writing field, wherein the position coding pattern encodes at least one pair of absolute coordinate positions used to grant access authorization, whereby the position coding pattern is read during an unformatted displacement of a user unit over the writing field, and wherein the user unit is configured to convert the position coding pattern to the at least one pair of coordinates.

58. The base according to claim 57, wherein the user unit is configured to read a sequence of coordinate pairs describing the displacement of the user unit, and further wherin the sequence of coordinate pairs are compared to a stored sequence of coordinate pairs for granting access authorization.

59. The base according to claim 58, wherein the stored sequence of coordinate pairs represents a user's signature.

60. The base according to claim 57, wherein the substrate is a card.

61. The base according to claim 60, wherein the card is substantially similar to a credit card with respect to size and material.

62. A method for controlling access to an access protected unit, comprising:

providing a position coding pattern associated with a writing field coupled to a base, wherein the position coding pattern encodes at least one pair of absolute coordinate positions used to grant access authorization;

moving a user unit in an unformatted manner in proximity to the writing field;

reading the position coding pattern during the moving;

converting the position coding pattern to the at least one pair of coordinates; and granting access to an access protected unit based upon the at least one pair of coordinates.

63. The method according to claim 62, further comprising: reading a sequence of coordinate pairs describing the displacement of the user unit; and comparing the sequence of coordinate pairs are to a stored sequence of coordinate pairs for granting access authorization.

64. The method according to claim 63, wherein the stored sequence of coordinate pairs represent a user's signature.

65. The method according to claim 62, where in the base is a card.

66. The method according to claim 62, further comprising:

checking if the pair of coordinates are within a coordinate area belonging to an authorized user.

* * * * *